(12) United States Patent
Kogure et al.

(10) Patent No.: US 12,410,326 B2
(45) Date of Patent: Sep. 9, 2025

(54) COATING LIQUID, PRODUCTION METHOD FOR COATING FILM, AND COATING FILM

(71) Applicant: HITACHI CHEMICAL COMPANY, LTD., Tokyo (JP)

(72) Inventors: Kaito Kogure, Tokyo (JP); Tatsuya Makino, Tokyo (JP); Tomohiko Kotake, Tokyo (JP); Hiroyuki Izumi, Tokyo (JP); Satoshi Takayasu, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 0 days.

(21) Appl. No.: 16/652,871

(22) PCT Filed: Apr. 16, 2018

(86) PCT No.: PCT/JP2018/015700
§ 371 (c)(1),
(2) Date: Apr. 1, 2020

(87) PCT Pub. No.: WO2019/069492
PCT Pub. Date: Apr. 11, 2019

(65) Prior Publication Data
US 2020/0248011 A1    Aug. 6, 2020

(30) Foreign Application Priority Data
Oct. 4, 2017 (WO) .................. PCT/JP2017/036163

(51) Int. Cl.
| | | |
|---|---|---|
| C09D 7/61 | (2018.01) | |
| C09D 7/65 | (2018.01) | |
| C09D 133/10 | (2006.01) | |
| C09D 163/00 | (2006.01) | |

(52) U.S. Cl.
CPC .................. C09D 7/65 (2018.01); C09D 7/61 (2018.01); C09D 133/10 (2013.01); C09D 163/00 (2013.01)

(58) Field of Classification Search
CPC ....................................................... C09D 7/61
See application file for complete search history.

(56) References Cited

U.S. PATENT DOCUMENTS

| | | | |
|---|---|---|---|
| 3,367,742 A | 2/1968 | Marotta et al. | |
| 5,916,954 A * | 6/1999 | Bohn | B32B 25/02 524/495 |
| 5,948,314 A | 9/1999 | Geiss et al. | |
| 6,887,563 B2 * | 5/2005 | Frank | C04B 28/26 428/313.9 |
| 2007/0135567 A1 * | 6/2007 | Ruhoff | C09D 133/14 525/55 |
| 2015/0240076 A1 | 8/2015 | Eling et al. | |
| 2018/0009969 A1 * | 1/2018 | Kim | C01B 33/1585 |
| 2020/0231834 A1 * | 7/2020 | Izumi | C08L 101/12 |

FOREIGN PATENT DOCUMENTS

| | | | |
|---|---|---|---|
| CN | 1511183 A | 7/2004 | |
| CN | 104152029 A * | 11/2014 | |
| CN | 105199522 A | 12/2015 | |
| CN | 105802299 A * | 7/2016 | ............... C09D 4/06 |
| CN | 106930492 A * | 7/2017 | |
| EP | 3124555 A1 | 2/2017 | |
| JP | H10-508049 A | 8/1998 | |
| JP | 2000-026609 A | 1/2000 | |
| JP | 2004-534108 A | 11/2004 | |
| JP | 2006-515556 A | 6/2006 | |
| JP | 2012-233110 A | 11/2012 | |
| JP | 5250900 B2 | 7/2013 | |
| JP | 2014-035044 A | 2/2014 | |
| JP | 2017-031386 A | 2/2017 | |
| KR | 2010033396 A * | 3/2010 | |
| KR | 2010-0075789 A | 7/2010 | |
| KR | 10-1645973 B1 | 8/2016 | |
| KR | 10-2020-0061336 A | 6/2020 | |
| WO | 03/097227 A1 | 11/2003 | |
| WO | 2019/069495 A1 | 4/2019 | |

OTHER PUBLICATIONS

Machine translation of CN 106930492 A, published Jul. 7, 2017.*
Machine translation of KR 2010-033396 A, published Mar. 29, 2010.*
Machine translation of CN 104152029 A, published Nov. 19, 2014.*
Full English-language translation of KR 2010-033396 A, published Mar. 29, 2010.*
Chen Zuyun et al., "Handbook of Packaging Materials and Containers, 1st edition", Guangdong Science and Technology Press, Feb. 28, 1998, p. 561 (Cited in office action mailed Feb. 25, 2022, in CN Patent Application No. 201880062942.9; see English translation of office action mailed Feb. 25, 2022, in CN Patent Application No. 201880062942.9 for concise explanation).
Department of Agricultural Machinery, "Strain Gauge Electrical Testing Technology, 1st edition", Jilin University of Technology, etc. Guangdong Science and Technology Press, Mar. 31, 1978, p. 36 (Cited in office action mailed Feb. 25, 2022, in CN Patent Application No. 201880062942.9; see English translation of office action mailed Feb. 25, 2022, in CN Patent Application No. 201880062942.9 for concise explanation).
English Translation of Office Action dated Feb. 25, 2022 in counterpart CN Patent Application No. 201880062942.9 (concise explanation for Cite Nos. 1 and 2).

(Continued)

*Primary Examiner* — Vickey Nerangis
(74) *Attorney, Agent, or Firm* — FITCH, EVEN, TABIN & FLANNERY, LLP

(57) ABSTRACT

The present invention relates to a coating liquid comprising an aerogel particle, a liquid medium, a first binder resin, and a second binder resin having lower solubility in the liquid medium than the first binder resin.

20 Claims, 1 Drawing Sheet

(56) References Cited

OTHER PUBLICATIONS

Lankveld J.M.G. et al., "Adsorption of polyvinylalcohol on paraffin-water interfaces and the properties of paraffin-in-water emulsions stabilized by polyvinylalcohol: an experimental study", Jan. 1, 1970, XP093136019 (cited in an Office Action dated Mar. 6, 2024 in counterpart EP Patent App. No. 18864230.0).

* cited by examiner

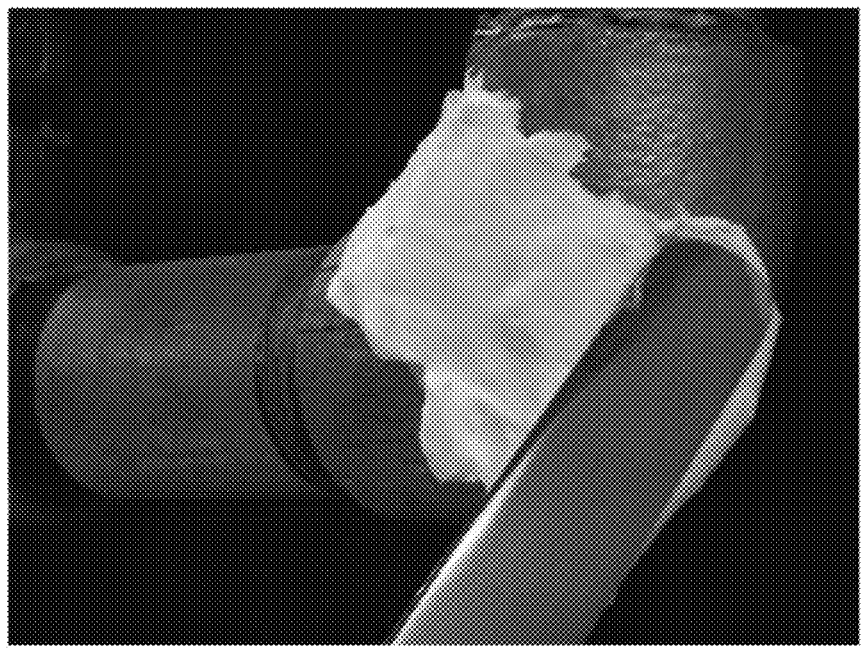

COATING LIQUID, PRODUCTION METHOD FOR COATING FILM, AND COATING FILM

CROSS-REFERENCE TO RELATED APPLICATIONS

This application is a U.S. national phase application filed under 35 U.S.C. § 371 of International Application No. PCT/JP2018/015700, filed Apr. 16, 2018, designating the United States, which claims priority from International Application No. PCT/JP2017/036163, filed Oct. 4, 2017, which are hereby incorporated herein by reference in their entirety.

TECHNICAL FIELD

The present invention related to a coating liquid, a method for producing a coating film, and a coating film.

BACKGROUND ART

An aerogel is known as a material excellent in thermal insulation, transparency and the like. A method in which an aerogel having such properties is processed into a particle to be used as a constituent material of a thermal insulator has been proposed (for example, Patent Literature 1). Patent Literature 1 describes a method for producing a thermal insulator (molded material), wherein an intermediate product obtained by preparing an aqueous dispersion containing an aerogel particle and organic fiber and then vaporizing water therefrom is press-molded.

CITATION LIST

Patent Literature

Patent Literature 1: Japanese Unexamined Patent Publication No. 2014-35044

SUMMARY OF INVENTION

Technical Problem

When a thermal insulator is obtained as a molded material, it is originally difficult to produce a molded material conforming to a complicated surface shape of, for example, an object to be insulated. Besides, even if a molded material having a desired shape can be obtained, a technique for adhering the molded material onto the object to be insulated thereafter, or the like is separately necessary. In consideration of these problems, a method in which a thermal insulator is directly formed on an object to be insulated by preparing a coating liquid containing an aerogel particle and applying the resultant onto the object to be insulated may be considered. Even when the aqueous dispersion described in Patent Literature 1 is used as a coating liquid, however, it is difficult to form a coating film having sufficient coating film strength and adhesiveness.

The present invention was devised in consideration of the circumstances described above, and an object is to provide an aerogel particle-containing coating liquid with which a coating film excellent in coating film strength and adhesiveness can be obtained. Another object of the present invention is to provide a method for producing a coating film using the above coating liquid, and an aerogel particle-containing coating film excellent in coating film strength and adhesiveness.

Solution to Problem

The present inventors made earnest studies to achieve the objects described above, resulting in finding that a coating film excellent in coating film strength and adhesiveness can be formed by using two or more binder resins having different solubility in a liquid medium contained in a coating liquid.

The present invention provides a coating liquid, comprising: an aerogel particle; a liquid medium; a first binder resin; and a second binder resin having lower solubility in the liquid medium than the first binder resin. According to such a coating liquid, a coating film excellent in coating film strength and adhesiveness can be obtained.

In the present invention, the liquid medium may be a water-based solvent containing water. Thus, dispersibility of the aerogel particle is improved, and hence a homogeneous coating film is easily obtained.

In the present invention, a content of the second binder resin may be higher than a content of the first binder resin. Thus, a coating film more excellent in the coating film strength and the adhesiveness is easily obtained.

In the present invention, the first binder resin may be a cellulose-based resin. Thus, a coating film excellent in the coating film strength and the adhesiveness is obtained, and in addition, an effect that viscosity of the coating liquid is so increased that a film is easily formed is attained.

In the present invention, the second binder resin may be a thermoplastic resin. Thus, a coating film further excellent in the adhesiveness is easily obtained. Besides, in the present invention, the second binder resin may be an acrylic resin.

In the present invention, the second binder resin may be a thermosetting resin, and in this case, the coating film may further comprise a curing agent. Thus, a coating film further excellent in the coating film strength is easily obtained. Besides, in the present invention, the second binder resin may be an epoxy resin, and in this case, the coating film may further comprise an epoxy resin curing agent.

In the present invention, the coating liquid may further comprise a fibrous substance. Thus, a coating film further excellent in the coating film strength is easily obtained.

The present invention also provides a method for producing a coating film, comprising a step of removing the liquid medium from the above coating liquid. According to such a production method, a coating film excellent in the coating film strength and the adhesiveness is easily obtained.

The present invention further relates to a coating film, comprising: an aerogel particle; a first binder resin; and a second binder resin having lower solubility in a water-based solvent than the first binder resin, or a cured product thereof. Such a coating film is excellent in the coating film strength and the adhesiveness, and can be suitably used for application as a thermal insulator or the like.

Advantageous Effects of Invention

According to the present invention, an aerogel particle-containing coating liquid with which a coating film (aerogel coating film) excellent in coating film strength and adhesiveness can be obtained can be provided. The present invention can also provide a method for producing a coating film using the above coating liquid, and an aerogel particle-containing coating film excellent in coating film strength and adhesiveness.

BRIEF DESCRIPTION OF DRAWINGS

FIG. 1 is a diagram illustrating a method for applying a coating liquid onto an object by using a trowel.

DESCRIPTION OF EMBODIMENTS

Hereinafter, a preferred embodiment of the present invention will be described in detail. It is noted that the present invention is not limited to the following embodiment. In the present specification, a numerical range described by using "to" refers to a range including numerical values placed before and after "to" respectively as the minimum value and the maximum value. The term "A or B" may include any one of A and B, and may include both. Materials exemplified in the embodiments may be used singly or in combination of two or more unless otherwise specified.

<Aerogel>

In a narrow sense, a dry gel obtained from a wet gel by a supercritical drying method is designated as an aerogel, a dry gel obtained by drying under atmospheric pressure is designated as a xerogel, and a dry gel obtained by freeze-drying is designated as a cryogel, but in the present embodiment, a dry gel having low density obtained by any of these methods for drying a wet gel is designated as an "aerogel". In other words, in the present embodiment, the term "aerogel" means an aerogel in a broad sense, namely, "gel comprised of a microporous solid in which the dispersed phase is a gas". In general, an aerogel has a network microstructure inside, and has a cluster structure in which particulate aerogel components of about 2 to 20 nm are bonded to one another. There is a pore smaller than 100 nm between skeletons formed by the cluster. Therefore, three-dimensional microporous structure is formed in an aerogel. Furthermore, an aerogel of the present embodiment is, for example, a silica aerogel containing silica as a main component. An example of the silica aerogel includes a so-called organic-inorganic hybridized silica aerogel into which an organic group (such as a methyl group) or an organic chain has been introduced.

As the aerogel according to the present embodiment, the following aspects can be mentioned. When these aspects are employed, an aerogel excellent in thermal insulation, flame retardance, heat resistance and flexibility is easily obtained. When each of these aspects is employed, aerogels having thermal insulation, flame retardance, heat resistance and flexibility corresponding to the respective aspects can be obtained.

(First Aspect)

The aerogel according to the present embodiment may have a structure represented by the following formula (1). The aerogel according to the present embodiment may have a structure represented by the following formula (1a) as a structure including the structure represented by the formula (1).

[Chemical Formula 1]

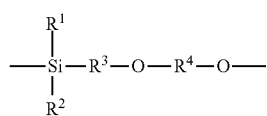

(1)

[Chemical Formula 2]

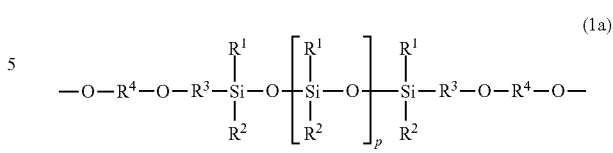

(1a)

In the formula (1) and the formula (1a), $R^1$ and $R^2$ each independently represent an alkyl group or an aryl group, and $R^3$ and $R^4$ each independently represent an alkylene group. Here, examples of the aryl group include a phenyl group and a substituted phenyl group. Examples of a substituent of the substituted phenyl group include an alkyl group, a vinyl group, a mercapto group, an amino group, a nitro group and a cyano group. p represents an integer of 1 to 50. In the formula (1a), two or more $R^1$ may be the same or different, and similarly, two or more $R^2$ may be the same or different. In the formula (1a), two $R^3$ may be the same or different, and similarly, two $R^4$ may be the same or different.

When the structure represented by the above formula (1) or the formula (1a) is introduced into a skeleton of an aerogel as an aerogel component, an aerogel having low thermal conductivity and having flexibility is obtained. From this point of view, in the formula (1) and the formula (1a), $R^1$ and $R^2$ can each independently be an alkyl group having 1 to 6 carbon atoms, a phenyl group or the like, and examples of such an alkyl group include a methyl group. Besides, in the formula (1) and the formula (1a), $R^3$ and $R^4$ can each independently be an alkylene group having 1 to 6 carbon atoms or the like, and examples of such an alkylene group include an ethylene group and a propylene group. In the formula (1a), p can be 2 to 30, and may be 5 to 20.

Second Aspect

The aerogel according to the present embodiment may have a ladder-type structure including struts and bridges, and the bridges may have a structure represented by the following formula (2). When such a ladder-type structure is introduced into a skeleton of an aerogel as an aerogel component, heat resistance and mechanical strength can be improved. In the present embodiment, the term "ladder-type structure" refers to a structure including two struts and bridges connecting the struts to each other (a structure in the shape of a so-called "ladder"). In this aspect, the skeleton of the aerogel may have the ladder-type structure, or the aerogel may partially have the ladder-type structure.

[Chemical Formula 3]

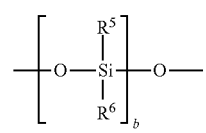

(2)

In the formula (2), $R^5$ and $R^6$ each independently represent an alkyl group or an aryl group, and b represents an integer of 1 to 50. Here, examples of the aryl group include a phenyl group and a substituted phenyl group. Examples of a substituent of the substituted phenyl group include an alkyl group, a vinyl group, a mercapto group, an amino group, a nitro group and a cyano group. When b is an integer of 2 or more in the formula (2), two or more $R^5$ may be the same or different, and similarly, two or more $R^6$ may be the same or different.

When the above structure is introduced into a skeleton of an aerogel as an aerogel component, the resultant is an aerogel more excellent in flexibility than, for example, a conventional aerogel having a structure derived from ladder-type silsesquioxane (namely, having a structure represented by the following formula (X)). Silsesquioxane is polysiloxane having a composition formula: $(RSiO_{1.5})_n$, and may have various skeleton structures including cage-type, ladder-type and random-type structures. Although the structure of the bridge is —O— in the conventional aerogel having the structure derived from the ladder-type silsesquioxane as represented by the following formula (X), the structure of the bridge is the structure represented by the above formula (2) (polysiloxane structure) in the aerogel according to the present embodiment. It should be noted that the aerogel of this aspect may further include a structure derived from silsesquioxane in addition to the structure represented by the formula (2).

[Chemical Formula 4]

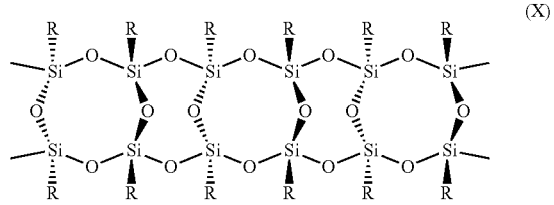

(X)

In the formula (X), R represents a hydroxy group, an alkyl group or an aryl group.

The structure and the chain length of the struts and the interval between the structures of the bridges are not particularly limited, and from the viewpoint that the heat resistance and the mechanical strength are further improved, a ladder-type structure represented by the following formula (3) may be employed as the ladder-type structure.

[Chemical Formula 5]

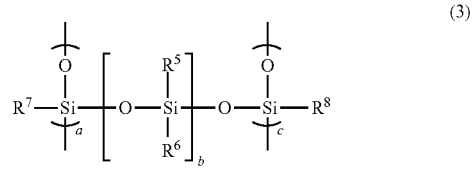

(3)

In the formula (3), $R^5$, $R^6$, $R^7$ and $R^8$ each independently represent an alkyl group or an aryl group, a and c each independently represent an integer of 1 to 3000, and b represents an integer of 1 to 50. Here, examples of the aryl group include a phenyl group and a substituted phenyl group. Examples of a substituent of the substituted phenyl group include an alkyl group, a vinyl group, a mercapto group, an amino group, a nitro group and a cyano group. When b is an integer of 2 or more in the formula (3), two or more $R^5$ may be the same or different, and similarly, two or more $R^6$ may be the same or different. When a is an integer of 2 or more in the formula (3), two or more $R^7$ may be the same or different, and similarly, when c is an integer of 2 or more, two or more $R^8$ may be the same or different.

Furthermore, from the viewpoint of obtaining more excellent flexibility, $R^5$, $R^6$, $R^7$ and $R^8$ in the formulas (2) and (3) (wherein $R^7$ and $R^8$ are used only in the formula (3)) can each independently be an alkyl group having 1 to 6 carbon atoms, a phenyl group or the like, and an example of the alkyl group includes a methyl group. Besides, in the formula (3), a and c can each independently be 6 to 2000, and may be 10 to 1000. Furthermore, in the formulas (2) and (3), b can be 2 to 30, and may be 5 to 20.

Third Aspect

The aerogel according to the present embodiment may be a dried substance of a wet gel (one obtained by drying a wet gel generated from a sol; a dried substance of a sol-derived wet gel) that is a condensate of a sol containing at least one selected from the group consisting of a silicon compound having a hydrolyzable functional group or a condensable functional group, and a hydrolysis product of a silicon compound having a hydrolyzable functional group. Furthermore, the aerogels described above may be thus obtained by drying a wet gel generated from a sol containing the silicon compound or the like.

As the silicon compound having a hydrolyzable functional group or a condensable functional group, a polysiloxane compound can be used. Specifically, the above sol may contain at least one compound selected from the group consisting of a polysiloxane compound having a hydrolyzable functional group or a condensable functional group, and a hydrolysis product of a polysiloxane compound having a hydrolyzable functional group (hereinafter sometimes referred to as the "polysiloxane compound group").

A functional group of the polysiloxane compound is not particularly limited, and can be a group reacting with the same functional group or reacting with another functional group. An example of the hydrolyzable functional group includes an alkoxy group. Examples of the condensable functional group include a hydroxyl group, a silanol group, a carboxyl group and a phenolic hydroxyl group. The hydroxyl group may be contained in a hydroxyl group-containing group such as a hydroxyalkyl group. Furthermore, the polysiloxane compound having a hydrolyzable functional group or a condensable functional group may further contain a reactive group different from the hydrolyzable functional group and the condensable functional group (a functional group corresponding to neither the hydrolyzable functional group nor the condensable functional group). Examples of the reactive group include an epoxy group, a mercapto group, a glycidoxy group, a vinyl group, an acryloyl group, a methacryloyl group and an amino group. The epoxy group may be contained in an epoxy group-containing group such as a glycidoxy group. Polysiloxane compounds having such functional groups and reactive groups may be used singly, or used as a mixture of two or more thereof. Examples of a group for improving the flexibility of the aerogel among these functional groups and reactive groups include an alkoxy group, a silanol group, a hydroxyalkyl group, and among these, an alkoxy group and a hydroxyalkyl group can further improve compatibility of the sol. Besides, from the viewpoints of improvement of reactivity of the polysiloxane compound and reduction of the thermal conductivity of the aerogel, the number of carbon atoms of the alkoxy group and the hydroxyalkyl group can be 1 to 6, and may be 2 to 4 from the viewpoint of improvement of the flexibility of the aerogel.

An example of the polysiloxane compound having a hydroxyalkyl group in a molecule includes one having a structure represented by the following formula (A). When the polysiloxane compound having the structure represented by the following formula (A) is used, the structure represented by the formula (1) and the formula (1a) can be introduced into a skeleton of an aerogel.

[Chemical Formula 6]

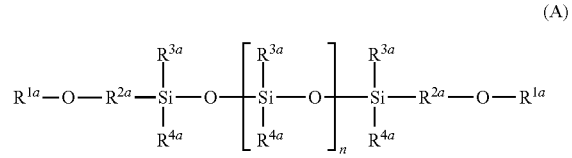

(A)

In the formula (A), $R^{1a}$ represents a hydroxyalkyl group, $R^{2a}$ represents an alkylene group, $R^{3a}$ and $R^{4a}$ each independently represent an alkyl group or an aryl group, and n represents an integer of 1 to 50. Here, examples of the aryl group include a phenyl group and a substituted phenyl group. Examples of a substituent of the substituted phenyl group include an alkyl group, a vinyl group, a mercapto group, an amino group, a nitro group and a cyano group. In the formula (A), two $R^{1a}$ may be the same or different, and similarly, two $R^{2a}$ may be the same or different. In the formula (A), two or more $R^{3a}$ may be the same or different, and similarly, two or more $R^{4a}$ may be the same or different.

When a wet gel that is a condensate of a sol (generated from a sol) containing a polysiloxane compound having the above structure is used, an aerogel having low thermal conductivity and having flexibility is more easily obtained. From these points of view, $R^{1a}$ in the formula (A) can be a hydroxyalkyl group having 1 to 6 carbon atoms or the like, and examples of the hydroxyalkyl group include a hydroxyethyl group and a hydroxypropyl group. Besides, $R_{2a}$ in the formula (A) can be an alkylene group having 1 to 6 carbon atoms or the like, and examples of the alkylene group include an ethylene group and a propylene group. Furthermore, $R^{3a}$ and $R^{4a}$ in the formula (A) can each independently be an alkyl group having 1 to 6 carbon atoms, a phenyl group or the like, and an example of the alkyl group includes a methyl group. Besides, n in the formula (A) can be 2 to 30, and may be 5 to 20.

As the polysiloxane compound having the structure represented by the above formula (A), a commercially available product can be used, and examples include compounds such as X-22-160AS, KF-6001, KF-6002 and KF-6003 (all manufactured by Shin-Etsu Chemical Co., Ltd.) and compounds such as XF42-B0970 and Fluid OFOH 702-4% (both manufactured by Momentive).

An example of a polysiloxane compound having an alkoxy group in a molecule includes one having a structure represented by the following formula (B). When the polysiloxane compound having the structure represented by the following formula (B) is used, the ladder-type structure including the bridges represented by the formula (2) or (3) can be introduced into a skeleton of an aerogel.

[Chemical Formula 7]

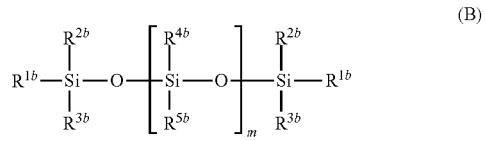

(B)

In the formula (B), $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 1 to 50. Here, examples of the awl group include a phenyl group and a substituted phenyl group. Examples of a substituent of the substituted phenyl group include an alkyl group, a vinyl group, a mercapto group, an amino group, a nitro group and a cyano group. In the formula (B), two $R^{1b}$ may be the same or different, two $R^{2b}$ may be the same or different, and similarly, two $R^{3b}$ may be the same or different. Besides, when m is an integer of 2 or more in the formula (B), two or more $R^{4b}$ may be the same or different, and similarly, two or more $R^{5b}$ may be the same or different.

When a wet gel that is a condensate of a sol (generated from a sol) containing the polysiloxane compound having the above structure or a hydrolyzed product thereof is used, an aerogel having low thermal conductivity and having flexibility is more easily obtained. From these points of view, $R^{1b}$ in the formula (B) can be an alkyl group having 1 to 6 carbon atoms, an alkoxy group having 1 to 6 carbon atoms or the like, and examples of the alkyl group or the alkoxy group include a methyl group, a methoxy group and an ethoxy group. Besides, $R^{2b}$ and $R^{3b}$ in the formula (B) can each independently be an alkoxy group having 1 to 6 carbon atoms or the like, and examples of the alkoxy group include a methoxy group and an ethoxy group. Furthermore, $R^{4b}$ and $R^{5b}$ in the formula (B) can each independently be an alkyl group having 1 to 6 carbon atoms, a phenyl group or the like, and an example of the alkyl group includes a methyl group. Besides, m in the formula (B) can be 2 to 30, and may be 5 to 20.

The polysiloxane compound having the structure represented by the above formula (B) can be obtained by appropriately referring to production methods reported in Japanese Unexamined Patent Publication No. 2000-26609 and Japanese Unexamined Patent Publication No. 2012-233110. Alternatively, XR31-B1410 (manufactured by Momentive) can also be used as the polysiloxane compound.

Furthermore, since an alkoxy group hydrolyzes, there is a possibility that the polysiloxane compound having an alkoxy group is present in a sol as a hydrolysis product, and hence, the polysiloxane compound having an alkoxy group and the hydrolysis product thereof may be present as a mixture. Besides, in the polysiloxane compound having an alkoxy group, all the alkoxy groups in molecules may be hydrolyzed, or may be partially hydrolyzed.

Such polysiloxane compounds having a hydrolyzable functional group or a condensable functional group, and hydrolysis products of the polysiloxane compounds having a hydrolyzable functional group may be used singly, or used as a mixture of two or more thereof.

In preparation of the aerogel of the present embodiment, a silicon compound other than the above-described polysiloxane compound can be used as the silicon compound having a hydrolyzable functional group or a condensable functional group. Specifically, the sol containing the above silicon compound can include, in addition to the above-described polysiloxane compound group or instead of the above-described polysiloxane compound group, at least one selected from the group consisting of a silicon compound (excluding the polysiloxane compound) having a hydrolyzable functional group or a condensable functional group, and a hydrolysis product of the silicon compound having a hydrolyzable functional group (hereinafter, sometimes referred to as the "silicon compound group"). The number of silicon atoms in a molecule of the silicon compound can be 1 or 2.

The silicon compound having a hydrolyzable functional group in a molecule is not particularly limited, and an example includes alkyl silicon alkoxide. From the viewpoint of improving water resistance, the number of hydrolyzable functional groups in the alkyl silicon alkoxide can be 3 or less. Examples of such alkyl silicon alkoxide include monoalkyl trialkoxysilane, monoalkyl dialkoxysilane, dialkyl dialkoxysilane, monoalkyl monoalkoxysilane, dialkyl monoalkoxysilane and trialkyl monoalkoxysilane, and specific examples include methyltrimethoxysilane, methyldimethoxysilane, dimethyldiethoxysilane, dimethyldimethoxysilane, ethyltrimethoxysilane and hexyltrimethoxysilane. Here, an example of the hydrolyzable functional group includes an alkoxy group such as a methoxy group or an ethoxy group.

The silicon compound having a condensable functional group is not particularly limited, and examples include silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol and trifluoropropylsilanetriol.

The silicon compound having a hydrolyzable functional group or a condensable functional group may further contain the above-described reactive group different from the hydrolyzable functional group and the condensable functional group (the functional group corresponding to neither the hydrolyzable functional group nor the condensable functional group).

As a silicon compound having three or less hydrolyzable functional groups and a reactive group, vinyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane or the like can also be used.

Besides, as a silicon compound having a condensable functional group and having a reactive group, vinylsilanetriol, 3-glycidoxypropylsilanetriol, 3-glycidoxypropylmethylsilanediol, 3-methacryloxypropyl silanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, N-2-(aminoethyl)-3-aminopropylmethylsilanediol or the like can also be used.

Alternatively, bis(trimethoxysilyl)methane, bis(trimethoxysilyl)ethane, bis(trimethoxysilyl)hexane, ethyltrimethoxysilane, vinyltrimethoxysilane or the like, that is, a silicon compound having 3 or less hydrolyzable functional groups at a molecular end, can be used.

The silicon compound having a hydrolyzable functional group or a condensable functional group (excluding the polysiloxane compound), and the hydrolysis product of the silicon compound having a hydrolyzable functional group may be used singly, or used as a mixture of two or more thereof.

When the above silicon compound (excluding the polysiloxane compound) is used, the structure represented by the following formulas (4) to (6) can be introduced into a skeleton of an aerogel. The aerogel according to the present embodiment can include any one of these structures singly, or include two or more thereof.

[Chemical Formula 8]

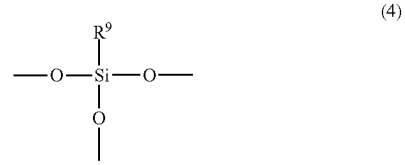

(4)

In the formula (4), $R^9$ represents an alkyl group. Here, the alkyl group can be an alkyl group having 1 to 6 carbon atoms or the like, and an example of the alkyl group includes a methyl group.

[Chemical Formula 9]

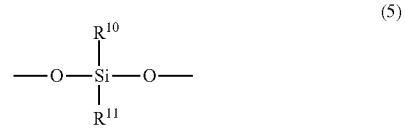

(5)

In the formula (5), $R^{10}$ and $R^{11}$ each independently represent an alkyl group. Here, the alkyl group can be an alkyl group having 1 to 6 carbon atoms or the like, and an example of the alkyl group includes a methyl group.

[Chemical Formula 10]

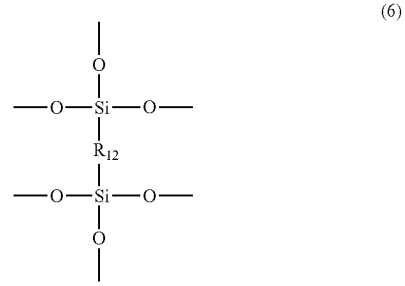

(6)

In the formula (6), $R^{12}$ represents an alkylene group. Here, the alkylene group can be an alkylene group having 1 to 10 carbon atoms or the like, and examples of the alkylene group include an ethylene group and a hexylene group.

Fourth Aspect

From the viewpoint of further toughening and achieving further excellent thermal insulation and flexibility, the aerogel according to the present embodiment may further contain a silica particle in addition to the aerogel component. An aerogel containing the aerogel component and the silica particle can be designated as an aerogel complex. The aerogel complex contains the aerogel component and the silica particle complexed to each other and has a cluster structure that is a characteristic of an aerogel, and probably has a three-dimensional microporous structure.

The aerogel containing the aerogel component and the silica particle can be referred to as a dried substance of a wet gel that is a condensate of a sol containing at least one selected from the group consisting of a silicon compound having a hydrolyzable functional group or a condensable functional group, and the hydrolysis product of the silicon compound having a hydrolyzable functional group described above, and a silica particle. Accordingly, the description of the first to third aspects can be appropriately applied to the aerogel according to the present embodiment.

Any silica particle can be used without limit, and an example includes an amorphous silica particle. Examples of the amorphous silica particle include a fused silica particle, a fumed silica particle and a colloidal silica particle. Among these, a colloidal silica particle has high monodispersity, and is easily inhibited from aggregating in a sol. Furthermore, the silica particle may be a silica particle having a hollow structure, a porous structure or the like.

The shape of the silica particle is not particularly limited, and examples include a spherical shape, a cocoon shape and an associated shape. Among these, when a particle in a spherical shape is used as a silica particle, the aggregation in a sol is easily inhibited. An average primary particle size of the silica particle may be 1 nm or more, may be 5 nm or more, or may be 20 nm or more from the viewpoints that appropriate strength and flexibility can be easily imparted to an aerogel and that an aerogel excellent in shrinkage resistance in drying is easily obtained. The average primary particle size of the silica particle may be 500 nm or less, may be 300 nm or less, or may be 100 nm or less from the viewpoints that the solid heat conduction of the silica particle can be easily inhibited, and that an aerogel excellent in thermal insulation is easily obtained. From these points of view, the average primary particle size of the silica particle may be 1 to 500 nm, may be 5 to 300 nm, or may be 20 to 100 nm.

In the present embodiment, the average particle size of the aerogel component and the average primary particle size of the silica particle can be obtained by directly observing the aerogel with a scanning electron microscope (hereinafter abbreviated as "SEM"). The term "diameter" herein means a diameter obtained assuming that a cross section of a particle exposed on a cross section of the aerogel is a circle. Besides, the term "diameter obtained assuming that the cross section is a circle" refers to a diameter of a perfect circle having the same area as the cross section. Furthermore, for calculating the average particle size, diameters of circles with respect to 100 particles are obtained to calculate an average thereof.

Furthermore, the average particle size of the silica particle may be measured based on a raw material. For example, a biaxial average primary particle size is calculated based on results of observation of arbitrary 20 particles with a SEM as follows. Regarding, for example, a colloidal silica particle dispersed in water usually at a solid content concentration of about 5 to 40% by mass, a chip obtained by cutting a wafer having a wiring pattern thereon into a 2 cm square is immersed in a dispersion of the colloidal silica particle for about 30 seconds, and the resultant chip is rinsed with pure water for about 30 seconds and dried by nitrogen blowing. Thereafter, the chip is placed on a sample table for SEM observation, and under an acceleration voltage of 10 kV, the silica particles are observed at 100000 magnification to take an image. In the thus obtained image, 20 silica particles are arbitrarily selected, and an average of particle sizes of these particles is defined as the average particle size.

The number of silanol groups per 1 g of the silica particle may be $10 \times 10^{18}$/g or more, may be $50 \times 10^{18}$/g or more, or may be $100 \times 10^{18}$/g or more from the viewpoint that an aerogel excellent in shrinkage resistance is easily obtained. The number of silanol groups per 1 g of the silica particle may be $1000 \times 10^{18}$/g or less, may be $800 \times 10^{18}$/g or less, or may be $700 \times 10^{18}$/g or less from the viewpoint that a homogenous aerogel is easily obtained. From these points of view, the number of silanol groups per 1 g of the silica particle may be $10 \times 10^{18}$ to $1000 \times 10^{18}$/g, may be $50 \times 10^{18}$ to $800 \times 10^{18}$/g, or may be $100 \times 10^{18}$ to $700 \times 10^{18}$/g.

A content of the polysiloxane compound group (a sum of a content of the polysiloxane compound having a hydrolyzable functional group or a condensable functional group, and a content of a hydrolysis product of the polysiloxane compound having a hydrolyzable functional group) contained in the above sol may be 5 parts by mass or more, or may be 10 parts by mass or more with respect to 100 parts mass of the total amount of the sol from the viewpoint that good reactivity is more easily obtained. The content of the polysiloxane compound group contained in the above sol may be 50 parts by mass or less, or may be 30 parts by mass or less with respect to 100 parts by mass of the total amount of the sol from the viewpoint that good compatibility is more easily obtained. From these points of view, the content of the polysiloxane compound group contained in the above sol may be 5 to 50 parts by mass, or may be 10 to 30 parts by mass with respect to 100 parts by mass of the total amount of the sol.

When the above sol contains the silicon compound (excluding the polysiloxane compound), the silicon compound group (a sum of a content of the silicon compound having a hydrolyzable functional group or a condensable functional group, and a content of a hydrolysis product of the silicon compound having a hydrolyzable functional group) may be 5 parts by mass or more, or may be 10 parts by mass or more with respect to 100 parts by mass of the total amount of the sol from the viewpoint that good reactivity is more easily obtained. The content of the silicon compound group contained in the above sol may be 50 parts by mass or less, or may be 30 parts by mass or less with respect to 100 parts by mass of the total amount of the sol from the viewpoint that good compatibility is more easily obtained. From these points of view, the content of the silicon compound group contained in the above sol may be 5 to 50 parts by mass, or may be 10 to 30 parts by mass.

When the sol contains both the polysiloxane compound group and the silicon compound group, a ratio between the content of the polysiloxane compound group and the content of the silicon compound group may be 1:0.5 or more, or may be 1:1 or more from the viewpoint that good compatibility is more easily obtained. The ratio between the content of the polysiloxane compound group and the content of the silicon compound group may be 1:4 or less, or may be 1:2 or less from the viewpoint that shrinkage of the gel is more easily inhibited. From these points of view, the ratio between the content of the polysiloxane compound group and the content of the silicon compound group may be 1:0.5 to 1:4, or may be 1:1 to 1:2.

When the above sol contains the silica particle, a content of the silica particle may be 1 part by mass or more, or may be 4 parts by mass or more with respect to 100 parts by mass of the total amount of the sol from the viewpoints that appropriate strength is easily imparted to an aerogel and that an aerogel excellent in the shrinkage resistance in drying is easily obtained. The content of the silica particle may be 20 parts by mass or less, or may be 15 parts by mass or less with respect to 100 parts by mass of the total amount of the sol from the viewpoints that the solid heat conduction of the silica particle is easily inhibited and that an aerogel excellent in thermal insulation is easily obtained. From these points of view, the content of the silica particle may be 1 to 20 parts by mass, or may be 4 to 15 parts by mass with respect to 100 parts by mass of the total amount of the sol.

<Aerogel Particle>

The aerogel particle according to the present embodiment can be obtained, for example, by crushing a bulk aerogel as described below.

An average particle size D50 of the aerogel particle can be 1 to 1000 μm, and may be 3 to 700 μm, may be 5 to 500 μm, may be 10 to 100 μm, or may be 10 to 50 μm. When the average particle size D50 of the aerogel particle is 1 μm or more, an aerogel particle excellent in dispersibility, handleability and the like is easily obtained. On the other hand, when the average particle size D50 is 1000 μm or less, an aerogel particle excellent in dispersibility is easily obtained. The average particle size of the aerogel particle can be appropriately adjusted in accordance with a crushing method, crushing conditions, a sieving and classifying method and the like.

The average particle size D50 of the aerogel particle can be measured by a laser diffraction scattering method. For example, an aerogel particle is added to a solvent (ethanol) to obtain a content thereof of 0.05 to 5% by mass, and the resultant is vibrated using a 50 W ultrasonic homogenizer for 15 to 30 minutes to disperse the aerogel particle. Thereafter, about 10 mL of the dispersion is injected into a laser diffraction scattering particle size distribution measuring apparatus to measure the particle size at 25° C. with a refractive index of 1.3 and absorption of 0. Then, a particle size corresponding to a 50% integrated value (based on volume) in this particle size distribution is defined as the average particle size D50. As the measuring apparatus, for example, Microtrac MT3000 (product name, manufactured by Nikkiso Co., Ltd.) can be used.

A specific surface area of the aerogel particle can be 350 $m^2/g$ or less, and may be 300 $m^2/g$ or less, may be 250 $m^2/g$ or less, or may be 150 $m^2/g$ or less. Thus, a coating liquid excellent in film formability is easily prepared. The lower limit of the specific surface area of the aerogel particle is not particularly limited, and from the viewpoints of inhibiting aggregation in the coating liquid and improving a filling factor, can be about 30 $m^2/g$. Various methods can be considered as a method for adjusting the specific surface area of the aerogel particle, and examples of the methods include a method wherein the amount of the aerogel component having the bridge structure represented by the formula (2) is adjusted, and a method wherein the amount of the silica particle is adjusted.

The specific surface area can be measured by a BET method. As a measurement apparatus, a gas adsorption measuring apparatus (Autosorb-iQ (Autosorb being their registered trademark) manufactured by Quantachrome Instruments Japan G.K.) can be used.

<Method for Producing Aerogel Particle>

A method for producing the aerogel particle is not particularly limited, and for example, the aerogel particle can be produced by the following method.

The aerogel particle of the present embodiment can be produced by a production method principally including a sol generating step, a wet gel generating step of obtaining a wet gel by gelation of a sol obtained in the sol generating step and then aging the sol, a washing/solvent replacing step of washing the wet gel obtained in the wet gel generating step and (if necessary) subjecting the wet gel to solvent replacement, a drying step of drying the wet gel having been washed and subjected to the solvent replacement, and a crushing step of crushing an aerogel obtained by drying.

Alternatively, the aerogel particle may be produced by a production method principally including a sol generating step, a wet gel generating step, a wet gel crushing step of crushing a wet gel obtained in the wet gel generating step, a washing/solvent replacing step and a drying step.

The aerogel particle thus obtained can be further sorted in size by sieving, classification or the like. The dispersibility can be improved by sorting the particle size. Furthermore, the term "sol" refers to a state obtained before occurrence of a gelation reaction, and means, in the present embodiment, a state where the above silicon compound, and the silica particle when used, are dissolved or dispersed in the solvent. Besides, a wet gel means a gel solid in a wet state that contains a liquid medium and does not have flowability.

(Sol Generating Step)

The sol generating step is a step in which a sol is generated after the silicon compound, and the silica particle (that may be a solvent containing the silica particle) when used, are mixed to perform a hydrolysis reaction. In this step, an acid catalyst may be further added to the solvent for accelerating the hydrolysis reaction. Besides, as described in Japanese Patent No. 5250900, a surfactant, a thermally hydrolyzable compound or the like can be added to the solvent. Furthermore, for purposes of inhibition of heat ray radiation or the like, a component such as carbon graphite, an aluminum compound, a magnesium compound, a silver compound or a titanium compound may be added to the solvent.

As the solvent, for example, water or a mixture of water and an alcohol can be used. Examples of the alcohol include methanol, ethanol, n-propanol, 2-propanol, n-butanol, 2-butanol and t-butanol. Among these, from the viewpoint of reducing interfacial tension against a gel wall, as an alcohol having low surface tension and a low boiling point, methanol, ethanol, 2-propanol and the like can be used. These may be used singly, or used as a mixture of two or more thereof.

For example, when an alcohol is used as the solvent, an amount of the alcohol can be 4 to 8 moles per 1 mole of the total amount of the silicon compound group and the polysiloxane compound group, and may be 4 to 6.5, or may be 4.5 to 6 moles. When the amount of the alcohol is 4 moles or more, good compatibility is more easily obtained, and when it is 8 moles or less, the shrinkage of the gel is more easily inhibited.

Examples of the acid catalyst include inorganic acids such as hydrofluoric acid, hydrochloric acid, nitric acid, sulfuric acid, sulfurous acid, phosphoric acid, phosphorous acid, hypophosphoric acid, bromic acid, chloric acid, chlorous acid and hypochlorous acid; acidic phosphates such as acidic aluminum phosphate, acidic magnesium phosphate and acidic zinc phosphate; and organic carboxylic acids such as acetic acid, formic acid, propionic acid, oxalic acid, malonic acid, succinic acid, citric acid, malic acid, adipic acid and azelaic acid. Among these, an acid catalyst more improving the water resistance of a resultant aerogel can be an organic carboxylic acid. The organic carboxylic acid can be acetic acid, and may be formic acid, propionic acid, oxalic acid, malonic acid or the like. These may be used singly, or used as a mixture of two or more thereof.

When the acid catalyst is used, the hydrolysis reaction of the silicon compound can be accelerated to obtain the sol in a shorter period of time.

An amount of the acid catalyst added can be 0.001 to 0.1 parts by mass with respect to 100 parts by mass of the total amount of the polysiloxane compound group and the silicon compound group.

As the surfactant, a nonionic surfactant, an ionic surfactant and the like can be used. These may be used singly, or used as a mixture of two or more thereof.

As the nonionic surfactant, for example, a compound including a hydrophilic moiety such as polyoxyethylene and a hydrophobic moiety having mainly an alkyl group, a compound including a hydrophilic moiety such as polyoxypropylene, or the like can be used. Examples of the compound including a hydrophilic moiety such as polyoxyethylene and a hydrophobic moiety having mainly an alkyl group include polyoxyethylene nonylphenyl ether, polyoxyethylene octylphenyl ether and polyoxyethylene alkyl ether. Examples of the compound including a hydrophilic moiety such as polyoxypropylene include polyoxypropylene alkyl ether, and a block copolymer of polyoxyethylene and polyoxypropylene.

Examples of the ionic surfactant include a cationic surfactant, an anionic surfactant, and an amphoteric surfactant. Examples of the cationic surfactant include cetyltrimethylammonium bromide and cetyltrimethylammonium chloride, and an example of the anionic surfactant includes sodium dodecylsulfonate. Besides, examples of the amphoteric surfactant include an amino acid-based surfactant, a betaine-based surfactant and an amine oxide-based surfactant. An example of the amino acid-based surfactant includes acylglutamic acid. Examples of the betaine-based surfactant include lauryl dimethylamino acetic acid betaine and stearyl dimethylamino acetic acid betaine. An example of the amine oxide-based surfactant includes lauryldimethylamine oxide.

It is regarded that such a surfactant has a function, in the wet gel generating step described below, to reduce a difference in chemical affinity between the solvent used in the reaction system and a siloxane polymer growing therein to inhibit phase separation.

An amount of the surfactant added varies depending on the type of the surfactant or the type and the amount of the silicon compound, and can be, for example, 1 to 100 parts by mass with respect to 100 parts by mass of the total amount of the polysiloxane compound group and the silicon compound group. Furthermore, the amount added may be 5 to 60 parts by mass.

It is regarded that the thermally hydrolyzable compound generates a base catalyst through thermal hydrolysis to make the reaction solution basic, and accelerates a sol-gel reaction in the wet gel generating step described below. Therefore, the thermally hydrolyzable compound is not particularly limited as long as it is a compound capable of making the reaction solution basic after the hydrolysis, and examples include urea; acid amides such as formamide, N-methylformamide, N,N-dimethylformamide, acetamide, N-methylacetamide and N,N-dimethylacetamide; and a cyclic nitrogen compound such as hexamethylenetetramine Among these, the acceleration effect described above is more easily obtained particularly by urea.

An amount of the thermally hydrolyzable compound added is not particularly limited as long as it is an amount with which the sol-gel reaction can be sufficiently accelerated in the wet gel generating step described below. When, for example, urea is used as the thermally hydrolyzable compound, the amount added thereof can be 1 to 200 parts by mass with respect to 100 parts by mass of the total amount of the polysiloxane compound group and the silicon compound group. Furthermore, the amount added may be 2 to 150 parts by mass. When the amount added is 1 part by mass or more, good reactivity is more easily obtained, and when it is 200 parts by mass or less, crystal precipitation and decrease of gel density are more easily inhibited.

Although the hydrolysis performed in the sol generating step varies depending on the types and the amounts of the silicon compound, the silica particle, the acid catalyst, the surfactant and the like contained in a mixture, the hydrolysis may be performed, for example, under a temperature environment of 20 to 60° C. for 10 minutes to 24 hours, or may be performed under a temperature environment of 50 to 60° C. for 5 minutes to 8 hours. Thus, the hydrolyzable functional group contained in the silicon compound is sufficiently hydrolyzed, and hence the hydrolysis product of the silicon compound can be more definitely obtained.

It is noted that, when the thermally hydrolyzable compound is added to the solvent, the temperature environment in the sol generating step may be adjusted to a temperature at which the hydrolysis of the thermally hydrolyzable compound is inhibited to inhibit gelation of the sol. The temperature at this point may be any temperature as long as the hydrolysis of the thermally hydrolyzable compound can be inhibited. When, for example, urea is used as the thermally hydrolyzable compound, the temperature environment in the sol generating step can be 0 to 40° C., and may be 10 to 30° C.

(Wet Gel Generating Step)

The wet gel generating step is a step in which the sol obtained in the sol generating step is allowed to undergo gelation, and then is aged to obtain a wet gel. In this step, a base catalyst for accelerating the gelation can be used.

Examples of the base catalyst include carbonates such as calcium carbonate, potassium carbonate, sodium carbonate, barium carbonate, magnesium carbonate, lithium carbonate, ammonium carbonate, copper (II) carbonate, iron (II) carbonate and silver (I) carbonate; bicarbonates such as calcium bicarbonate, potassium bicarbonate, sodium bicarbonate and ammonium bicarbonate; alkali metal hydroxides such as lithium hydroxide, sodium hydroxide, potassium hydroxide and cesium hydroxide; ammonium compounds such as ammonium hydroxide, ammonium fluoride, ammonium chloride and ammonium bromide; basic sodium phosphates such as sodium metaphosphate, sodium pyrophosphate and sodium polyphosphate; aliphatic amines such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine and triethanolamine; and nitrogen-containing heterocyclic compounds such as morpholine, N-methylmorpholine, 2-methylmorpholine and piperazine and a derivative thereof, piperidine and a derivative thereof, and imidazole and a derivative thereof. Among these, ammonium hydroxide (ammonium water) is excellent in a point that it has high volatility and hence minimally remains in an aerogel particle after drying, and therefore minimally impairs the water resistance, and further in an economic point. The above base catalysts may be used singly, or used as a mixture of two or more thereof.

When the base catalyst is used, a dehydration condensation reaction or a dealcoholization condensation reaction of the silicon compound and the silica particle contained in the sol can be accelerated, and hence the gelation of the sol can be performed in a shorter period of time. Besides, thus, a wet gel having high strength (rigidity) can be obtained. In particular, since ammonia has high volatility and hence minimally remains in an aerogel particle, when ammonia is used as the base catalyst, an aerogel particle more excellent in the water resistance can be obtained.

An amount of the base catalyst added can be 0.5 to 5 parts by mass with respect to 100 parts by mass of the total amount of the polysiloxane compound group and the silicon compound group, and may be 1 to 4 parts by mass. When it is 0.5 parts by mass or more, the gelation can be performed in a shorter period of time, and when it is 5 parts by mass or less, the degradation of the water resistance can be further inhibited.

The gelation of the sol in the wet gel generating step may be performed in a sealed vessel so as not to volatilize the solvent and the base catalyst. A gelation temperature can be 30 to 90° C., and may be 40 to 80° C. When the gelation temperature is 30° C. or more, the gelation can be performed in a shorter period of time, and a wet gel having higher strength (rigidity) can be obtained. Besides, when the gelation temperature is 90° C. or less, volatilization of the solvent (alcohol in particular) is easily inhibited, and hence the gelation can be performed with volume shrinkage suppressed.

The aging in the wet gel generating step may be performed in a sealed vessel so as not to volatilize the solvent and the base catalyst. The aging strengthens a bond between the components of a wet gel, and as a result, a wet gel having strength (rigidity) sufficiently high for inhibiting the shrinkage in drying can be obtained. An aging temperature can be 30 to 90° C., and may be 40 to 80° C. When the aging temperature is 30° C. or more, a wet gel having higher strength (rigidity) can be obtained, and when the aging temperature is 90° C. or less, the volatilization of the solvent (alcohol in particular) is easily inhibited, and hence the gelation can be performed with the volume shrinkage suppressed.

Furthermore, since it is difficult to determine an end point of the gelation of a sol in many cases, the gelation of the sol and the subsequent aging may be performed continuously through a series of operations.

A gelation time and an aging time can be appropriately set in accordance with the gelation temperature and the aging temperature. When the silica particle is contained in the sol, particularly the gelation time can be shortened as compared with the case where it is not contained. This is probably because a silanol group or a reactive group of the silicon compound contained in the sol forms a hydrogen bond or a chemical bond together with a silanol group of the silica particle. Furthermore, the gelation time can be 10 to 120 minutes, and may be 20 to 90 minutes. When the gelation time is 10 minutes or more, a more homogeneous wet gel is easily obtained, and when it is 120 minutes or less, procedures from the washing/solvent replacing step to the drying step described below can be simplified. Furthermore, a total time of the gelation time and the aging time in the whole gelation and aging process can be 4 to 480 hours, and may be 6 to 120 hours. When the sum of the gelation time and the aging time is 4 hours or more, a wet gel having higher strength (rigidity) can be obtained, and when it is 480 hours or less, the effect of the aging is more easily retained.

In order to decrease the density or increase an average pore size of a resultant aerogel particle, the gelation temperature and the aging temperature may be increased within the above range, or the total time of the gelation time and the aging time may be elongated within the above range. Besides, in order to decrease the density or increase the average pore size of a resultant aerogel particle, the gelation temperature and the aging temperature may be decreased within the above range, or the total time of the gelation time and the aging time may be shortened within the above range.

(Wet Gel Crushing Step)

When the wet gel crushing step is performed, the wet gel obtained in the wet gel generating step is crushed. The crushing can be performed by, for example, putting the wet gel in a Henschel mixer, or performing the wet gel generating step in a mixer and then operating the mixer under appropriate conditions (of rotation speed and rotation time). Alternatively, it can be performed more simply by putting the wet gel in a sealable vessel, or performing the wet gel generating step in a sealable vessel and then shaking the resultant with a shaking apparatus such as a shaker for an appropriate period of time. Furthermore, if necessary, the particle size of the wet gel can be adjusted by using a jet mill, a roller mill, a bead mill or the like.

(Washing/Solvent Replacing Step)

The washing/solvent replacing step is a step including a step of washing the wet gel obtained through the wet gel generating step or the wet gel crushing step (washing step), and a step of replacing a washing liquid contained in the wet gel with a solvent suitable for drying conditions (in the drying step described below) (solvent replacing step). The washing/solvent replacing step can be performed as an aspect where only the solvent replacing step is performed without performing the step of washing the wet gel, and from the viewpoint that impurities such as an unreacted material and a by-product contained in the wet gel are reduced to be able to produce an aerogel particle having higher purity, the wet gel may be washed.

In the washing step, the wet gel obtained through the wet gel generating step or the wet gel crushing step is washed. The washing can be repeatedly performed using, for example, water or an organic solvent. At this point, washing efficiency can be improved by heating.

As the organic solvent, various organic solvents such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethylsulfoxide, acetic acid and formic acid can be used. The above organic solvents may be used singly, or used as a mixture of two or more thereof.

In the solvent replacing step described below, a solvent having low surface tension can be used for inhibiting the shrinkage of the gel caused by drying. A solvent having low surface tension has, however, very low mutual solubility with water in general. Therefore, when a solvent having low surface tension is used in the solvent replacing step, the organic solvent used in the washing step can be a hydrophilic organic solvent having high mutual solubility with both water and a solvent having low surface tension. Furthermore, the hydrophilic organic solvent used in the washing step can play a role of preliminary replacement for the solvent replacing step. Among the above organic solvents, the hydrophilic organic solvent can be methanol, ethanol, 2-propanol, acetone, methyl ethyl ketone or the like. Furthermore, methanol, ethanol, methyl ethyl ketone and the like are economically superior.

An amount of the water or the organic solvent used in the washing step can be an amount sufficient for replacing the solvent contained in the wet gel and for washing. The amount can be 3 to 10 times as much as the volume of the wet gel. The washing can be repeated until a moisture content of the wet gel after the washing is 10% by mass or less with respect to the mass of silica.

A temperature environment in the washing step can be set to a temperature equal to or lower than the boiling point of the solvent used for the washing, and for example, when methanol is used, heating to about 30 to 60° C. is employed.

In the solvent replacing step, the solvent contained in the washed wet gel is replaced with a prescribed replacement solvent in order to inhibit the shrinkage of the aerogel in the drying step. At this point, replacing efficiency can be improved by heating. The replacement solvent can be specifically a solvent having low surface tension described below when the drying is performed in the drying step under atmospheric pressure at a temperature lower than a critical point of a solvent used in the drying. On the other hand, when supercritical drying is employed, examples of the replacement solvent include ethanol, methanol, 2-propanol, dichlorodifluoromethane, carbon dioxide and a mixed solvent of two or more thereof.

The solvent having low surface tension can be a solvent having surface tension at 20° C. of 30 mN/m or less. Furthermore, the surface tension may be 25 mN/m or less, or may be 20 mN/m or less. Examples of the solvent having low surface tension include aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2) and 1-pentene (16.0); aromatic hydrocarbons such as benzene (28.9), toluene (28.5), m-xylene (28.7) and p-xylene (28.3); halogenated hydrocarbons such as dichloromethane (27.9), chloroform (27.2), carbon tetrachloride (26.9), 1-chloropropane (21.8) and 2-chloropropane (18.1); ethers such as ethyl ether (17.1), propyl ether (20.5), isopropyl ether (17.7), butyl ethyl ether (20.8) and 1,2-dimethoxyethane (24.6); ketones such as acetone (23.3), methyl ethyl ketone (24.6), methyl propyl ketone (25.1) and diethyl ketone (25.3); and esters such as methyl acetate (24.8), ethyl acetate (23.8), propyl acetate (24.3), isopropyl acetate (21.2), isobutyl acetate (23.7) and ethyl butylate (24.6) (bracketed values indicating surface tension at 20° C. in unit of [mN/m]). Among these, the aliphatic hydrocarbons (such as hexane and heptane) not only have low surface tension but also are excellent in working environment properties. Besides, when a hydrophilic organic solvent such as acetone, methyl ethyl ketone or 1,2-dimethoxyethane among these is used, the solvent can be used also as the organic solvent for the above washing step. Furthermore, among these, a solvent having a boiling point under normal pressure of 100° C. or less may be used from the viewpoint that the drying is easily performed in the drying step described below. One of these solvents may be used singly, or used as a mixture of two or more thereof.

An amount of the solvent used in the solvent replacing step can be an amount with which the solvent contained in the wet gel after the washing can be sufficiently replaced. The amount can be 3 to 10 times as much as the volume of the wet gel.

A temperature environment in the solvent replacing step can be set to a temperature equal to or lower than the boiling point of the solvent used for the replacement, and for example, when heptane is used, heating to about 30 to 60° C. is employed.

Furthermore, when the gel contains the silica particle, the solvent replacing step is not necessary. This mechanism is presumed as follows. The silica particle functions as a support of a three-dimensional network skeleton, and hence the skeleton is supported so that the shrinkage of the gel caused in the drying step can be inhibited. Therefore, the gel can be directly subjected to the drying step without replacing the solvent used for the washing. In this manner, when the silica particle is used, the procedures from the washing/solvent replacing step to the drying step can be simplified.

(Drying Step)

In the drying step, the wet gel having been subjected to the washing and (if necessary) the solvent replacement as described above is dried. Thus, an aerogel (an aerogel block or an aerogel particle) can be obtained. Specifically, an aerogel prepared by drying the wet gel generated from the above sol can be obtained.

A drying method is not particularly limited, and known methods of normal pressure drying, supercritical drying or freeze drying can be employed. Among these, from the viewpoint that an aerogel having low density is easily produced, the normal pressure drying or the supercritical drying can be employed. Alternatively, from the viewpoint that it can be produced at low cost, the normal pressure drying can be employed. Furthermore, in the present embodiment, normal pressure means 0.1 MPa (atmospheric pressure).

The aerogel can be obtained by drying the wet gel having been subjected to the washing and (if necessary) solvent replacement under atmospheric pressure at a temperature lower than the critical point of the solvent used for the drying. A drying temperature varies depending upon the type of the replaced solvent (or the solvent used for the washing when the solvent replacement is not performed), and can be 20 to 150° C. in consideration that an evaporation rate of the solvent can be increased particularly by drying at a high temperature to cause a large crack in a gel in some cases. Furthermore, the drying temperature may be 60 to 120° C. Besides, a drying time varies depending upon the volume of the wet gel and the drying temperature, and can be 4 to 120 hours. Furthermore, the normal pressure drying encompasses that the drying is rapidly performed by applying a pressure lower than a critical point as long as the productivity is not impaired.

The aerogel can be obtained also by subjecting, to the critical drying, the wet gel having been subjected to the washing and (if necessary) the solvent replacement. The supercritical drying can be performed by a known method. A method for performing the supercritical drying can be, for example, a method in which the solvent is removed at a temperature and a pressure equal to or higher than the critical points of the solvent contained in the wet gel. Alternatively, the method for performing the critical drying can be a method in which the wet gel is immersed in liquefied carbon dioxide under conditions of, for example, 20 to 25° C. and about 5 to 20 MPa to replace the whole or a part of the solvent contained in the wet gel with carbon dioxide having a lower critical point than the solvent, and then the carbon dioxide is removed singly or a mixture of the carbon dioxide and the solvent is removed.

The aerogel thus obtained by the normal pressure drying or the supercritical drying may be further additionally dried under normal pressure at 105 to 200° C. for about 0.5 to 2 hours. Thus, an aerogel having low density and including a small pore can be more easily obtained. The additional drying may be performed under normal pressure at 150 to 200° C.

(Crushing Step)

When the wet gel crushing step is not performed, the aerogel (aerogel block) obtained by the drying is crushed to obtain an aerogel particle. The crushing can be performed, for example, by placing the aerogel in a jet mill, a roller mill, a bead mill, a hammer mill or the like, and operating at appropriate rotation speed and time.

<Coating Liquid>

A coating liquid contains the above-described aerogel particle, a liquid medium, a first binder resin and a second binder resin. It can be said that the coating liquid is a mixture of the above-described aerogel particle, the liquid medium, the first binder resin and the second binder resin. In the aerogel particle contained in the coating liquid, a pore may be filled with the liquid medium. Furthermore, a coating liquid having high viscosity (of, for example, 1000 mPa·s or more) can be designated as a paste.

The first binder resin and the second binder resin have a function of binding the aerogel particles to one another after coating film formation. Both the first binder resin and the second binder resin are dissolved in the liquid medium, and the solubility of the first binder resin in the liquid medium is higher than the solubility of the second binder resin in the liquid medium.

When such first binder resin and second binder resin are contained in the coating liquid, a coating film excellent in coating film strength and adhesiveness can be obtained. The reason is not necessarily clear, and the present inventors presume as follows. Since the first binder resin and the second binder resin are different in the solubility in the liquid medium, the second binder resin is saturated in the liquid medium priorly to the first binder resin in a drying step (a step of removing the liquid medium) performed in the coating film formation, and hence, the second binder resin tends to precipitate first. Owing to such difference in the solubility, a characteristic binder structure is formed in the coating film formation, and hence excellent coating film strength and adhesiveness are probably obtained.

The above-described characteristic binder structure is not necessarily clear, and it is presumed that the excellent coating film strength and adhesiveness are obtained because, for example, the second binder resin priorly binds onto the aerogel particle (and a fibrous substance described below), and the first binder resin binds, via the second binder resin, between the aerogel particles (or between the aerogel particle and the fibrous substance, or between the fibrous substances). Alternatively, it may be presumed that the aerogel particles are rigidly bound to one another because the second binder resin becomes granular to fill spaces between the aerogel particles and then, the resultant is bound by the first binder resin.

The binder resin has a function of binding the aerogel particles to one another in the coating film formation. Examples of the binder resin include an epoxy resin, a silicone resin, a phenol resin, a urea resin, a melamine resin, a polyurethane resin, a polyethylene resin, a polypropylene resin, a polystyrene resin, a polyester resin, an acrylic resin (a polymer containing an acrylic acid ester or a methacrylic acid ester as a main structural unit), a polyvinyl chloride resin, a polyvinyl acetate resin, a polyamide resin, a polyimide resin, a cellulose-based resin and a polyvinyl-based resin. Alternatively, as the binder resin, an acrylic acid-based resin (a polymer containing acrylic acid, acrylate, methacrylic acid or methacrylate as a structural unit), polyvinyl alcohol, polyethylene oxide or polyethylene glycol can be used. The first binder resin and the second binder resin may be selected from these, or may be selected from resins described below.

In the present embodiment, a content of the second binder resin is preferably higher than a content of the first binder resin. Thus, the above-described effects can be more remarkably exhibited. The content of the second binder resin is preferably over 100 parts by mass, more preferably 150 parts by mass or more, may be 200 parts by mass or more, may be 300 parts by mass or more, may be 400 parts by mass or more, or 600 parts by mass or more with respect to 100 parts by mass of the first binder resin.

Besides, the content of the second binder resin may be, from the viewpoint of excellent thermal insulation performance, 800 parts by mass or less, is preferably 700 parts by mass or less, may be 600 parts by mass or less, may be 500 parts by mass or less, or may be 400 parts by mass or less with respect to 100 parts by mass of the first binder resin.

A total content of the first binder resin and the second binder resin may be 5 parts by mass or more, is preferably 10 parts by mass or more, more preferably 15 parts by mass or more, and further preferably 20 parts by mass or more, for example, with respect to 100 parts by mass of the aerogel particle. Thus, the aerogel particles can be easily rigidly bound to one another by the binder resins, and the strength of a coating film is further improved.

The total content of the first binder resin and the second binder resin may be 150 parts by mass or less, is preferably 130 parts by mass or less, more preferably 100 parts by mass or less, and further preferably 90 parts by mass or less, for example, with respect to 100 parts by mass of the aerogel particle. Thus, a proportion of the aerogel particle in the coating film is increased, and hence the thermal insulation of a coating film is further improved.

The first binder resin may be any resin as long as it has a function of binding the aerogel particles to one another after the coating film formation and can be dissolved in the liquid medium. For example, when the liquid medium is a water-based solvent, the first binder resin can be, for example, a cellulose-based resin, polyvinyl alcohol, polyvinyl pyrrolidone, an acrylic acid-based resin, polyethylene oxide, and polyethylene glycol. Among these, from the viewpoint of excellent thickening properties, a cellulose-based resin, polyvinyl pyrrolidone or an acrylic acid-based resin can be suitably used.

Examples of the cellulose-based resin include hydroxypropyl methylcellulose, carboxymethylcellulose ammonium and hydroxyethylmethylcellulose.

Examples of the acrylic acid-based resin include polyacrylic acid, an acrylic acid copolymer, polyacrylate and an acrylate copolymer.

The second binder resin may be any resin as long as it can be dissolved in the liquid medium and has lower solubility in the liquid medium than the first binder resin. The second binder resin may be a thermoplastic resin, or may be a thermosetting resin.

Examples of the thermoplastic resin include an acrylic resin, polyvinyl alcohol, polypropylene and polyvinyl chloride. Among these, an acrylic resin or polyvinyl alcohol can be suitably used from the viewpoint of handleability.

Examples of the thermosetting resin include an epoxy resin, a silicone resin and polyurethane. Among these, an epoxy resin or a silicone resin can be suitably used from the viewpoint of excellent heat resistance.

When the second binder resin is a thermosetting resin, the coating film may further contain a curing agent. The curing agent is not particularly limited, and may be appropriately changed in accordance with the type of the thermosetting resin. For example, when the thermosetting resin is an epoxy resin, a known epoxy resin curing agent can be used as the curing agent. Examples of the epoxy resin curing agent include an amine-based curing agent, an acid anhydride-based curing agent and a polyamide-based curing agent, and from the viewpoint of reactivity, an amine-based agent or a polyamide-based agent can be suitably used.

Examples of the liquid medium include water and an organic solvent. The organic solvent is not particularly limited as long as the aerogel particle can be dispersed therein, and examples include aromatic hydrocarbons such as toluene, xylene, mesitylene, cumene and p-cymene; aliphatic hydrocarbons such as hexane, heptane and pentane; ethers such as diethyl ether, tetrahydrofuran and 1,4-dioxane; alcohols such as methanol, ethanol, isopropanol, butanol, ethylene glycol and propylene glycol; ketones such as acetone, methyl ethyl ketone, methyl isobutyl ketone, cyclohexanone and 4-hydroxy-4-methyl-2-pentanone; esters such as methyl acetate, ethyl acetate and butyl acetate; and amides such as N,N-dimethylformamide, N,N-dimethylacetamide and N-methylpyrrolidone. Among these, from the viewpoints of volatility, a boiling point and the like, alcohols and ketones can be used, and particularly, alcohols can be suitably used. Alcohols and ketones can be easily mixed with water, a water-based resin or the like, and hence can be suitably used together with such a component.

In a suitable aspect, the liquid medium is preferably a water-based solvent containing water. The water-based solvent may be water, or may be a mixed solvent containing water and an organic solvent. When such a liquid medium is used, dispersibility of the aerogel particle is improved, and hence a homogeneous coating film is easily obtained.

The coating liquid may further contain a fibrous substance. When such a coating liquid is used, the aerogel particle is bound to the fibrous substance in the coating film, and hence the aerogel particle is prevented from falling off from the coating film owing to an anchor effect. Besides, since the fibrous substance is dispersed in the coating film, the strength of the coating film is further improved.

Examples of the fibrous substance include organic fiber and inorganic fiber. Examples of the organic fiber include polyamide-based, polyimide-based, polyvinyl alcohol-based, polyvinylidene chloride-based, polyvinyl chloride-based, polyester-based, polyacrylonitrile-based, polyethylene-based, polypropylene-based, polyurethane-based, phenol-based, polyether ester-based and polylactic acid-based fiber. Examples of the inorganic fiber include glass fiber, carbon fiber, ceramic fiber and metal fiber.

A fiber length of the fibrous substance is not particularly limited, and for example, is preferably 1.5 mm or more, more preferably 2 mm or more, and further preferably 2.5 mm or more. The upper limit of the fiber length of the fibrous substance is not particularly limited, and may be, for example, 20 mm or less from the viewpoint of the dispersibility in the coating liquid.

A fiber diameter of the fiber can be 0.01 to 100 μm from the viewpoints of the dispersibility in the coating liquid, good anchoring function and the like.

A content of the fibrous substance is not particularly limited, and is, for example, preferably 5 parts by mass or more, more preferably 7 parts by mass or more, and further preferably 9 parts by mass or more with respect to 100 parts by mass of the aerogel particle. Thus, the anchoring effect owing to the fibrous substance is easily obtained, and the coating film strength is further improved.

Besides, the content of the fibrous substance is, for example, preferably 25 parts by mass or less, more preferably 20 parts by mass or less, and further preferably 15 parts by mass or less with respect to 100 parts by mass of the aerogel particle. Thus, the proportion of the aerogel particle in the coating film is increased, and hence, the thermal insulation of the coating film is further improved.

The coating liquid may further contain an additional component in addition to the above components. Examples of the additional component include a thickener, a pigment, a leveling agent and a film-forming aid. The thickener can improve the viscosity of the coating liquid to attain better coating properties on an object. Examples of the thickener include an organic polymer, fumed silica, a layered inorganic additive and a fine particle such as clay mineral.

A concentration of the coating liquid is not particularly limited, and may be appropriately changed in accordance with a desired thickness of the coating film, a coating method and the like. For example, a content of the aerogel particle in the coating liquid may be 0.1 to 30% by mass or may be 1 to 25% by mass. Besides, from the viewpoint that it is suitable for application using a trowel or the like, the content of the aerogel particle in the coating liquid may be 2% by mass or more, and may be 3% by mass or more.

A total content of the first binder resin and the second binder resin in the coating liquid can be 1 to 40% by mass, and may be 1 to 30% by mass from the viewpoints of binding properties between the aerogel particles, the thermal insulation of the coating film and the like.

A content of the fibrous substance in the coating liquid can be 1 to 50% by mass, and may be 1 to 30% by mass from the viewpoints of the dispersibility in the coating liquid, good anchoring function exhibiting properties and the like.

A content of the thickener can be appropriately adjusted to obtain a desired viscosity of the coating liquid (of, for example, 1000 mPa·s or more). The viscosity of the coating liquid can be increased also by blending a binder resin, and hence, in such a case, there is no need to always blend the thickener.

The coating liquid of the present embodiment is applicable in a wide range, for example, from large-scale facilities such as a plant and a power station to medium/compact equipment included in consumer electronics, vehicles and the like, and can reduce energy loss in various situations.

<Method for Producing Coating Film and Coating Film>

A method for producing a coating film (coating film formation method) includes a step of removing a liquid medium from a coating liquid containing an aerogel particle, the liquid medium, a first binder resin and a second binder resin. More specifically, the method for producing a coating film can include a step of applying the above-described coating liquid onto an object, and a step of removing the liquid medium from the coating liquid applied onto the object.

A method for applying the coating liquid onto the object is not particularly limited, and examples include dip coating, spray coating, spin coating and roll coating. In the formation of a coating film, the applied coating liquid may be allowed to stand under an environment of 0 to 40° C., or the applied coating liquid may be subjected to a heat treatment (at, for example, 40 to 150° C.) or a decompression treatment (at, for example, 10000 Pa or less), or both of these treatments.

Furthermore, since the coating liquid of the present embodiment may have a high viscosity (be in a paste form), the coating liquid may be applied onto the object using a trowel (metal spatula) or the like as illustrated in FIG. 1. In FIG. 1, the coating liquid is applied onto a bent portion of a piping by using a trowel. When the coating liquid of the present embodiment is used, a coating film having a thickness difficult to realize by using a conventional thermal insulation paint can be formed in a short period of time. Specifically, when such a coating liquid is used, a coating film having a thickness of at least about 2 mm can be formed through a one-time application, and as compared with a conventional paint capable of forming a coating film having a thickness of merely about 0.5 mm, very high working efficiency can be realized. Furthermore, since the coating liquid contains the aerogel particle, a coating film more excellent in the thermal insulation performance can be obtained than that obtained by the conventional thermal insulation paint.

When the second binder resin is a thermosetting resin, the method for producing a coating film may include a step of curing the second binder resin. In the present embodiment, the second binder resin may be cured, for example, after removing the liquid medium. In other words, the method for producing a coating film may include a step of removing the liquid medium, and a step of curing the second binder resin. Besides, in the present embodiment, the second binder resin may be cured simultaneously with removal of the liquid medium. In other words, the method for producing a coating film may include a step of removing the liquid medium and curing the second binder resin.

In this manner, a coating film containing the aerogel particle, the first binder resin and the second binder resin (or a cured product thereof) can be obtained.

A content of the aerogel particle in the coating film may be, for example, 40% by mass or more, is preferably 50% by mass or more, may be 60% by mass or more, and may be 70% by mass or more. Thus, the thermal insulation of the coating film is further improved. Besides, the content of the aerogel particle in the coating film is, for example, preferably 95% by mass or less, and more preferably 90% by mass or less. Thus, the coating film tends to be easily formed.

A content of the first binder resin in the coating film may be, for example, 2 parts by mass or more, is preferably 5 parts by mass or more, and more preferably 8 parts by mass or more with respect to 100 parts by mass of the aerogel particle. Besides, the content of the first binder resin in the coating film may be, for example, 20 parts by mass or less, and is preferably 17 parts by mass or less and more preferably 15 parts by mass or less with respect to 100 parts by mass of the aerogel particle.

A content of the second binder resin (or the cured product thereof) in the coating film may be, for example, 10 parts by mass or more, is preferably 15 parts by mass or more and may be 20 parts by mass or more with respect to 100 parts by mass of the aerogel particle. Besides, the content of the second binder resin (or the cured product thereof) in the coating film may be, for example, 100 parts by mass or less, is preferably 80 parts by mass or less, and may be 60 parts by mass or less, and may be 40 parts by mass or less with respect to 100 parts by mass of the aerogel particle.

The coating film may contain, for example, 50 to 95% by mass of the aerogel particle and 1 to 50% by mass of the binder resins. The thickness of the coating film is not particularly limited, and may be, for example, 0.01 to 5 mm.

Since the aerogel particle of the present embodiment is hydrophobic, the coating film has good water-repellency. In other words, performance degradation (such as degradation of thermal insulation) which is caused when the coating film contains water is difficult to occur, and hence, frequency of exchanging the coating film can be reduced. Besides, owing to the good water-repellency, there is no need to provide an external material for purposes of protecting the coating film. The water-repellency can be evaluated by measuring a contact angle between the coating film and water. The contact angle can be 90° or more, may be 110° or more, and may be 130° or more. The contact angle of the coating film can be adjusted in accordance with, for example, the content of the aerogel particle in the coating film, the type and the content of the liquid medium, and the like.

The coating film has good thermal insulation. The thermal insulation can be evaluated by measuring a 5% weight loss temperature of the coating film. For example, when measurement is performed using a differential heat/thermogravimetry simultaneous measurement apparatus with the temperature increased to 500° C. under conditions of a temperature increasing rate of 10° C./min, the 5% weight loss temperature can be 150° C. or more, may be 200° C. or more, or may be 250° C. or more. The thermal insulation of the coating film can be adjusted in accordance with, for example, the type and the content in the coating film of the binder resin or the like.

A material constituting the object is not particularly limited, and examples include metals, ceramics, glass, resins and composite materials of these. The shape of the object can be appropriately selected in accordance with a purpose of use and the material, and examples include a block shape, a sheet shape, a powder shape and a fibrous shape.

Furthermore, the shape of the object may be more complicated. The coating liquid of the present embodiment can provide a thermal insulation layer even on a surface of an object onto which a planar thermal insulator in a sheet shape or a board shape is difficult to attach, such as a component in a complicated shape or a piping (pipe) having a bent portion.

The coating film has excellent thermal insulation, heat resistance, flame retardance, water-repellency and the like owing to the aerogel. Owing to these advantages, the coating film can be applied for use as a thermal insulator in a cryogenic container, the space field, the architectural field, the automotive field (for example, as a thermal insulator for a vehicle component), the field of consumer electronics, the semiconductor field, industrial facilities (for example, as a thermal insulator for various piping in a plant or a power station) and the like. Furthermore, the coating film may be used not only as a thermal insulator but also as a water-repellent material, a sound absorbing material, a damping material, a catalyst carrier or the like.

EXAMPLES

The present invention will be described in more detail with reference to the following examples, and it is noted that the present invention is not limited to these examples.
(Preparation of Aerogel Particle)

100.0 parts by mass of PL-2L (product name, manufactured by Fuso Chemical Co., Ltd.) used as a silica particle-containing material, 80.0 parts by mass of water, 0.5 parts by mass of acetic acid used as an acid catalyst, 1.0 parts by mass of cetyltrimethylammonium bromide (manufactured by Wako Pure Chemical Industries Ltd.) used as a cationic surfactant, and 150.0 parts by mass of urea used as a thermally hydrolyzable compound were mixed, and to the thus obtained mixture, 60.0 parts by mass of methyltrimethoxysilane (product name: KBM-13, manufactured by Shin-Etsu Chemical Co., Ltd.), 20.0 parts by mass of dimethyldimethoxysilane (product name: KBM-22, manufactured by Shin-Etsu Chemical Co., Ltd.) and 20.0 parts by mass of a both-end bifunctional alkoxy-modified polysiloxane compound (hereinafter referred to as the "polysiloxane compound A") having a structure represented by the above formula (B) were added as silicon compounds, and the resultant was reacted at 25° C. for 2 hours to obtain a sol. The thus obtained sol was allowed to undergo gelation at 60° C., and the resultant was aged at 60° C. for 48 hours to obtain a wet gel.

Furthermore, the above "polysiloxane compound A" was synthesized as follows. First, in a 1 L three-neck flask equipped with a stirrer, a thermometer and a Dimroth condenser, 100.0 parts by mass of dimethylpolysiloxane XC96-723 (product name, manufactured by Momentive) having silanol groups at both ends, 181.3 parts by mass of methyltrimethoxysilane and 0.50 parts by mass of t-butylamine were mixed and reacted at 30° C. for 5 hours. Thereafter, the resultant reaction solution was heated under a reduced pressure of 1.3 kPa at 140° C. for 2 hours to remove a volatile component, and thus, the both-end bifunctional alkoxy-modified polysiloxane compound (polysiloxane compound A) was obtained.

Thereafter, the thus obtained wet gel was transferred to a plastic bottle, and was crushed, after sealing the bottle, using an extreme mill (MX-1000XTS, manufactured by As One Corporation) at 27,000 rpm for 10 minutes to obtain a particulate wet gel. The thus obtained particulate wet gel was immersed in 2500.0 parts by mass of methanol, and washed at 25° C. over 24 hours. This washing operation was performed three times in total with the methanol exchanged with fresh one. The thus washed particulate wet gel was then immersed in 2500.0 parts by mass of heptane, that is, a low surface tension solvent, and solvent replacement was performed at 25° C. over 24 hours. This solvent replacement operation was performed three times in total with the heptane exchanged with fresh one. The particulate wet gel thus washed and solvent replaced was dried under normal pressure at 40° C. for 96 hours, and thereafter, was further dried at 150° C. for 2 hours. Ultimately, the resultant was passed through a sieve (opening: 45 µm, wire diameter: 32 µm, manufactured by Tokyo Screen Co., Ltd.), and thus, aerogel particles having structures represented by the above formulas (3), (4) and (5) were obtained.

Example A-1

A coating liquid was obtained by mixing 10 parts by mass of hydroxypropyl methyl cellulose (product name: MP-30000, manufactured by Matsumoto Yushi-Seiyaku Co., Ltd.), 10 parts by mass of glass fiber (product name: Chopped Strand, fiber diameter: 13 µm, fiber length: 3 mm), 100 parts by mass of the aerogel particle, 16 parts by mass of an acrylic resin (product name: KH-CT-865, manufactured by Hitachi Chemical Co., Ltd.), 350 parts by mass of methyl ethyl ketone (MEK) and 200 parts by mass of water.

The coating liquid was applied onto an aluminum foil (My Foil Atsugata (Thick) 50, manufactured by UACJ Corporation, thickness: 50 µm) to obtain a thickness after drying of 2 mm, and the resultant was dried using a drier (product name: Perfect Oven SPHH-301, manufactured by ESPEC Corp.) heated to 60° C. for 2 hours to obtain an aerogel-containing coating film.

The coating film thus obtained was measured for coating film strength (tensile strength) and adhesive strength (peel strength) by the following methods. The results are shown in Table 1.

<Measurement of Tensile Strength>

The coating film obtained was processed into a size of 2×5×5 mm to be used as a measurement sample. As a measurement apparatus, a compact desktop tester "EZTest" (product name, manufactured by Shimadzu Corporation) was used. Furthermore, 500 N was used as a load cell. Besides, threaded flat grippers vertically disposed were used, and the sample was set therein with a vertical distance set to 25 mm to perform a tension test at a speed of 2.5 mm/min. The measurement was terminated when the sample was fractured.

<Measurement of Peel Strength>

The coating film with the aluminum foil was cut at intervals of 3 mm to obtain measurement samples. As a measurement apparatus, a compact desktop tester "EZTest" (product name, manufactured by Shimadzu Corporation) was used. For the measurement, the sample was fixed with the aluminum foil faced upward, and the aluminum foil was gripped to perform a tension test at a speed of 50 mm/min. The measurement was terminated when the aluminum foil peeled off from the coating film.

Example A-2

A coating liquid was prepared in the same manner as in Example A-1 except that the amount of the acrylic resin was changed to 33 parts by mass. Besides, the thus obtained coating liquid was used to produce an aerogel-containing coating film in the same manner as in Example A-1. The thus obtained coating film was measured for the coating film strength (tensile strength) and the adhesive strength (peel strength) in the same manner as in Example A-1. The results are shown in Table 1.

Example A-3

A coating liquid was prepared in the same manner as in Example A-1 except that the amount of the acrylic resin was changed to 66 parts by mass. Besides, the thus obtained coating liquid was used to produce an aerogel-containing coating film in the same manner as in Example A-1. The thus obtained coating film was measured for the coating film strength (tensile strength) and the adhesive strength (peel strength) in the same manner as in Example A-1. The results are shown in Table 1.

Example B-1

A coating liquid was obtained by mixing 10 parts by mass of hydroxypropyl methyl cellulose (product name: MP-30000, manufactured by Matsumoto Yushi-Seiyaku Co., Ltd.), 10 parts by mass of glass fiber (product name: Chopped Strand, fiber diameter: 13 µm, fiber length: 3 mm), 100 parts by mass of the aerogel powder, 16 parts by mass of an epoxy resin (product name: jER811, manufactured by Mitsubishi Chemical Corporation), 1.6 parts by mass of triethylenetetramine (TETA, manufactured by Wako Pure Chemical Industries Ltd.) used as a curing agent, 350 parts by mass of methyl ethyl ketone (MEK) and 200 parts by mass of water.

The coating liquid was applied onto an aluminum foil (My Foil Atsugata (Thick) 50, manufactured by UACJ Corporation, thickness: 50 µm) to obtain a thickness after drying of 2 mm, and the resultant was dried using a drier (product name: Perfect Oven SPHH-301, manufactured by ESPEC Corp.) heated to 60° C. for 2 hours to obtain an aerogel-containing coating film.

The coating film thus obtained was measured for the coating film strength (tensile strength) and the adhesive strength (peel strength) in the same manner as in Example A-1. The results are shown in Table 1.

Example B-2

A coating liquid was prepared in the same manner as in Example B-1 except that the amount of the epoxy resin was changed to 33 parts by mass and that the amount of the curing agent was changed to 3.3 parts by mass. Besides, the thus obtained coating liquid was used to produce an aerogel-containing coating film in the same manner as in Example B-1. The thus obtained coating film was measured for the coating film strength (tensile strength) and the adhesive strength (peel strength) in the same manner as in Example A-1. The results are shown in Table 1.

Example B-3

A coating liquid was prepared in the same manner as in Example B-1 except that the amount of the epoxy resin was changed to 66 parts by mass and that the amount of the curing agent was changed to 6.6 parts by mass. Besides, the thus obtained coating liquid was used to produce an aerogel-containing coating film in the same manner as in Example B-1. The thus obtained coating film was measured for the coating film strength (tensile strength) and the adhesive strength (peel strength) in the same manner as in Example A-1. The results are shown in Table 1.

Furthermore, all the coating liquids of the examples had viscosity exceeding 10000 mPa·s.

Comparative Example 1

A coating liquid was prepared in the same manner as in Example A-1 except that the acrylic resin was not blended. Besides, the thus obtained coating liquid was used to produce an aerogel-containing coating film in the same manner as in Example A-1. The thus obtained coating film was measured for the coating film strength (tensile strength) and the adhesive strength (peel strength) in the same manner as in Example A-1. The results are shown in Table 1.

In Table 1, "Second Binder Resin" indicates a content with respect to 100 parts by mass of the first binder resin, "Peel Strength" indicates a measurement result obtained as described in <Measurement of Peel Strength> above, and "Tensile Break Strength" indicates a measurement result obtained as described in <Measurement of Tensile Strength> above.

measurement sample, and the contact angle was measured after 5 minutes. As a measurement apparatus, a contact angle meter (LSE-B100, manufactured by NIC Corporation) was used. The contact angle of the coating film was 123°.

(Evaluation of Heat Resistance)

The coating film obtained in Example A-1 was used for evaluating heat resistance. First, the coating film obtained was peeled off from the aluminum foil to be used as a measurement sample. As a measurement apparatus, a differential heat/thermogravimetry simultaneous measurement apparatus (TG/DTA STA7300, manufactured by Hitachi High-Tech Science Corporation) was used to perform the measurement with the temperature increased up to 500° C. at a temperature increasing rate of 10° C./min, and a 5% weight loss temperature was recorded. Furthermore, in order to eliminate weight change due to water evaporation, the weight of the coating film at 100° C. was defined as a reference weight (zero point). The 5% weight loss temperature of the coating film was 270° C.

(Evaluation of Thermal Insulation)

The coating film obtained by using the coating liquid of Example A-1 was evaluated for the thermal insulation. First, the coating liquid was applied with a metal trowel onto an alumite-treated aluminum plate (50×50 mm, thickness: 0.5 mm) to obtain a prescribed thickness. The resultant coating liquid was dried at room temperature (25° C.) for 2 hours, and then further dried in a drier (Perfect Oven SPHH-301, manufactured by ESPEC Corp.) heated to 60° C. for 2 hours to prepare a plurality of evaluation samples different in the thickness of the coating film. When a thick coating film was to be obtained, the coating was performed again after drying the coating liquid applied once at room temperature for 2 hours. This operation was repeated until a desired thickness was obtained. Furthermore, a coating film having a thickness of about 2 mm could be obtained by the one-time application. The evaluation sample was placed with the aluminum plate side facing a glass heater (S-101, manufactured by Blast Inc.), and the temperature was increased to 150° C. A surface temperature of the evaluation sample (surface temperature of the coating film) after keeping the sample at 150° C. for 1 hour was measured using an infrared thermograph (FSV-1200-L16, manufactured by Apiste Corporation). The surface temperature was 150° C. when no coating film was provided (coating film thickness: 0 mm), and lowered to 130° C., 110° C., 85° C. and 65° C. as the thickness of the coating film was increased to 1.0 mm, 2.0 min, 5.0 mm and 10.0 mm.

TABLE 1

|  | Example A-1 | Example A-2 | Example A-3 | Example B-1 | Example B-2 | Example B-3 | Comparative Example 1 |
| --- | --- | --- | --- | --- | --- | --- | --- |
| Second Binder Resin | 160 | 330 | 660 | 160 | 330 | 660 | — |
| Peel Strength (kN/m) | 0.026 | 0.037 | 0.045 | 0.033 | 0.041 | 0.047 | 0.012 |
| Tensile Break Strength (MPa) | 0.57 | 0.60 | 0.70 | 0.50 | 0.57 | 0.61 | 0.2 |

(Evaluation of Water-Repellency)

The water-repellency of the coating film obtained in Example A-1 was evaluated by measuring a contact angle against water. The coating film was processed into a size of 50×50 mm to be used as a measurement sample. Then, about 3 μL of pure water was dropped onto the surface of the

The invention claimed is:

1. A coating liquid comprising:
   an aerogel particle;
   a liquid medium;
   a first binder resin, wherein the first binder resin is a cellulose-based resin;

a second binder resin soluble in the liquid medium, wherein the second binder resin is an epoxy resin, the second binder resin having lower solubility in the liquid medium than the first binder resin, wherein a content of the second binder resin is over 100 parts by mass and 600 parts by mass or less with respect to 100 parts by mass of the first binder resin; and a fibrous substance comprising fibers selected from organic fibers, glass fibers, carbon fibers and metal fibers, wherein a content of the fibrous substance is 5 parts by mass or more and 25 parts by mass or less with respect to 100 parts by mass of the aerogel particle, and wherein a total content of the first binder resin and the second binder resin is 5 parts by mass or more and less than 60 parts by mass with respect to 100 parts by mass of the aerogel particle.

2. The coating liquid according to claim 1, wherein the liquid medium is a water-based solvent containing water.

3. The coating liquid according to claim 1,
wherein the second binder resin is a thermosetting resin, and
the coating liquid further comprises a curing agent.

4. The coating liquid according to claim 1,
wherein
the coating liquid further comprises an epoxy resin curing agent.

5. The coating liquid according to claim 1, wherein the content of the second binder resin is 150 parts by mass or more and 600 parts by mass or less with respect to 100 parts by mass of the first binder resin.

6. The coating liquid according to claim 1, wherein the content of the second binder resin is 200 parts by mass or more and 600 parts by mass or less with respect to 100 parts by mass of the first binder resin.

7. The coating liquid according to claim 1, wherein the content of the second binder resin is 300 parts by mass or more and 600 parts by mass or less with respect to 100 parts by mass of the first binder resin.

8. The coating liquid according to claim 1, wherein the content of the second binder resin is 400 parts by mass or more and 600 parts by mass or less with respect to 100 parts by mass of the first binder resin.

9. The coating liquid according to claim 1, wherein a total content of the first binder resin and the second binder resin is 5 parts by mass or more and 57 parts by mass or less with respect to 100 parts by mass of the aerogel particle.

10. The coating liquid according to claim 1, wherein a content of the first binder resin is 2 parts by mass or more and 20 parts by mass or less with respect to 100 parts by mass of the aerogel particle.

11. The coating liquid according to claim 1, wherein the content of the second binder resin is 10 parts by mass or more and less than 57 parts by mass with respect to 100 parts by mass of the aerogel particle.

12. The coating liquid according to claim 1, wherein the fibrous substance comprises fibers having a fiber diameter of 0.01 to 100 μm.

13. A method for producing a coating film, comprising:
a step of removing the liquid medium from the coating liquid according to claim 1.

14. A coating liquid comprising:
an aerogel particle;
a liquid medium;
a first binder resin, wherein the first binder resin is a cellulose-based resin;
a second binder resin soluble in the liquid medium, wherein the second binder resin is an epoxy resin, the second binder resin having lower solubility in the liquid medium than the first binder resin, wherein a content of the second binder resin is over 100 parts by mass and 600 parts by mass or less with respect to 100 parts by mass of the first binder resin; and
a fibrous substance comprising fibers having a fiber diameter of 0.01 to 100 μm,
wherein a content of the fibrous substance is 5 parts by mass or more and 25 parts by mass or less with respect to 100 parts by mass of the aerogel particle, and wherein a total content of the first binder resin and the second binder resin is 5 parts by mass or more and less than 60 parts by mass with respect to 100 parts by mass of the aerogel particle.

15. The coating liquid according to claim 14, wherein a total content of the first binder resin and the second binder resin is 5 parts by mass or more and 57 parts by mass or less with respect to 100 parts by mass of the aerogel particle.

16. A coating film produced by method comprising applying the coating liquid according to claim 14 onto an object, and removing the liquid medium from the coating liquid applied onto the object.

17. A coating film comprising:
an aerogel particle;
a first binder resin, wherein the first binder resin is a cellulose-based resin; and
a second binder resin soluble in a water-based solvent, wherein the second binder resin is an epoxy resin, the second binder resin having lower solubility in the water-based solvent than the first binder resin, or a cured product thereof, wherein a content of the second binder resin is over 100 parts by mass and 600 parts by mass or less with respect to 100 parts by mass of the first binder resin; and
a fibrous substance comprising fibers selected from organic fibers, glass fibers, carbon fibers and metal fibers,
wherein a content of the fibrous substance is 5 parts by mass or more and 25 parts by mass or less with respect to 100 parts by mass of the aerogel particle, and wherein a total content of the first binder resin and the second binder resin is 5 parts by mass or more and less than 60 parts by mass with respect to 100 parts by mass of the aerogel particle.

18. The coating film according to claim 17, wherein the second binder resin is a thermosetting resin.

19. The coating film according to claim 17, wherein the content of the second binder resin is 150 parts by mass or more and 600 parts by mass or less with respect to 100 parts by mass of the first binder resin.

20. The coating film according to claim 17, wherein a total content of the first binder resin and the second binder resin is 5 parts by mass or more and 57 parts by mass or less with respect to 100 parts by mass of the aerogel particle.

* * * * *